US007406602B2

(12) United States Patent
Gauselmann

(10) Patent No.: US 7,406,602 B2
(45) Date of Patent: Jul. 29, 2008

(54) AUTHENTICATION OF DATA FOR A GAMING MACHINE

(75) Inventor: Paul Gauselmann, Moorweg 11, 32339 Espelkamp (DE)

(73) Assignee: Paul Gauselmann, Espelkamp (DE)

( * ) Notice: Subject to any disclaimer, the term of this patent is extended or adjusted under 35 U.S.C. 154(b) by 1055 days.

(21) Appl. No.: 10/184,200

(22) Filed: Jun. 26, 2002

(65) Prior Publication Data

US 2003/0008704 A1 Jan. 9, 2003

(30) Foreign Application Priority Data

Jul. 5, 2001 (DE) ............................... 101 32 052
Mar. 7, 2002 (DE) ............................... 102 10 173

(51) Int. Cl.
*H04L 9/00* (2006.01)

(52) U.S. Cl. ...................................................... 713/187

(58) Field of Classification Search .................. 463/25, 463/29; 713/180
See application file for complete search history.

(56) References Cited

U.S. PATENT DOCUMENTS 5,464,087 A 11/1995 Bounds et al.
5,643,086 A * 7/1997 Alcorn et al. ................. 463/29
5,674,128 A 10/1997 Holch et al. .................. 463/42
5,737,418 A 4/1998 Saffari et al.
5,845,069 A * 12/1998 Tanaka ........................ 726/20
5,918,720 A 7/1999 Robinson et al.
5,953,424 A * 9/1999 Vogelesang et al. ......... 713/169
6,185,316 B1 * 2/2001 Buffam ...................... 382/115
6,364,769 B1 * 4/2002 Weiss et al. ................... 463/29
6,368,219 B1 * 4/2002 Szrek et al. ................... 463/42
6,565,443 B1 * 5/2003 Johnson et al. ............... 463/43
6,595,856 B1 * 7/2003 Ginsburg et al. .............. 463/29
6,685,567 B2 * 2/2004 Cockerille et al. ............ 463/43
7,043,641 B1 * 5/2006 Martinek et al. ............ 713/187
7,116,782 B2 * 10/2006 Jackson et al. .............. 380/251
7,162,036 B2 * 1/2007 Rowe ......................... 380/251
7,203,841 B2 * 4/2007 Jackson et al. .............. 713/187

OTHER PUBLICATIONS

European Search Report.

* cited by examiner

*Primary Examiner*—Robert E Pezzuto
*Assistant Examiner*—Malina Dhillon
(74) *Attorney, Agent, or Firm*—Patent Law Group LLP; Brian D. Ogonowsky

(57) ABSTRACT

Data generated by certain peripheral devices, such as a coin or bill validator, within a gaming device is encrypted using a randomly generated key transmitted to the peripheral device by a main control unit in the gaming device. The peripheral device sends the encrypted data to the main control unit along with the clear text data. The control unit performs a reverse algorithm to recover the data from the encrypted number. The control unit compares the recovered data to the clear text data. If there is a match, the control unit acts on the data, such as by booking the coin value to a credit meter.

29 Claims, 1 Drawing Sheet

AUTHENTICATION OF DATA FOR A GAMING MACHINE

FIELD OF INVENTION

This invention is related to gaming devices and, in particular, to authenticating data, such as a coin value, transmitted from a peripheral device to a main control unit in the gaming device.

BACKGROUND

Certain sensitive data is transferred from peripheral devices within a gaming machine to the main control unit of the gaming machine. In one example, a coin or bill validator receives money from a player and generates data corresponding to the number of coins deposited or amount of money deposited. This data is sent via wires to a controller board containing a main control unit (a processor), and the control unit processes the data to generate credits within the gaming machine for use by the player to play the game. A typical game involves rotating and randomly stopping actual or simulated reels and determining an award to the player based upon the displayed symbol combination.

Casinos are concerned that the signals generated by the coin/bill validators, or other important signals, may be somehow fraudulently generated by the player or a casino employee in order to play or win the game.

Other peripheral devices, such as smart card readers, magnetic card readers, barcode readers, and other types of readers, also transmit signals that the casinos are worried about being fraudulently generated.

It is desirable to reduce the possibility of fraud involving the gaming machines by limiting a player's or casino employee's ability to fraudulently generate data signals within the gaming machine in an attempt to obtain credits or awards.

SUMMARY

Data generated by certain peripheral devices, such as a coin or bill validator, within the gaming device is encrypted (using an algorithm) to create an authentication number, and the authentication number is transmitted to the gaming device's main control unit along with the clear text data. At least one dynamically changing key is generated by the main control unit and transmitted to the peripheral device for use by the peripheral device in the algorithm to create the authentication number. In one embodiment, the key is a transaction number that randomly changes either periodically or after each coin transaction. The main control unit can transmit the key along with a periodic transaction request to the coin/bill validator.

Once the main control unit receives the authentication number and the clear text data from the peripheral device, the control unit performs a reverse algorithm to recover the data from the authentication number. The control unit compares the recovered data to the clear text data. If there is a match, the control unit acts on the data, such as by booking the coin value to a credit meter.

The authentication number cannot be fraudulently generated, so any data fraudulently generated by the player or a casino employee will not match the data derived from the authentication number.

DETAILED DESCRIPTION

Figure 1:
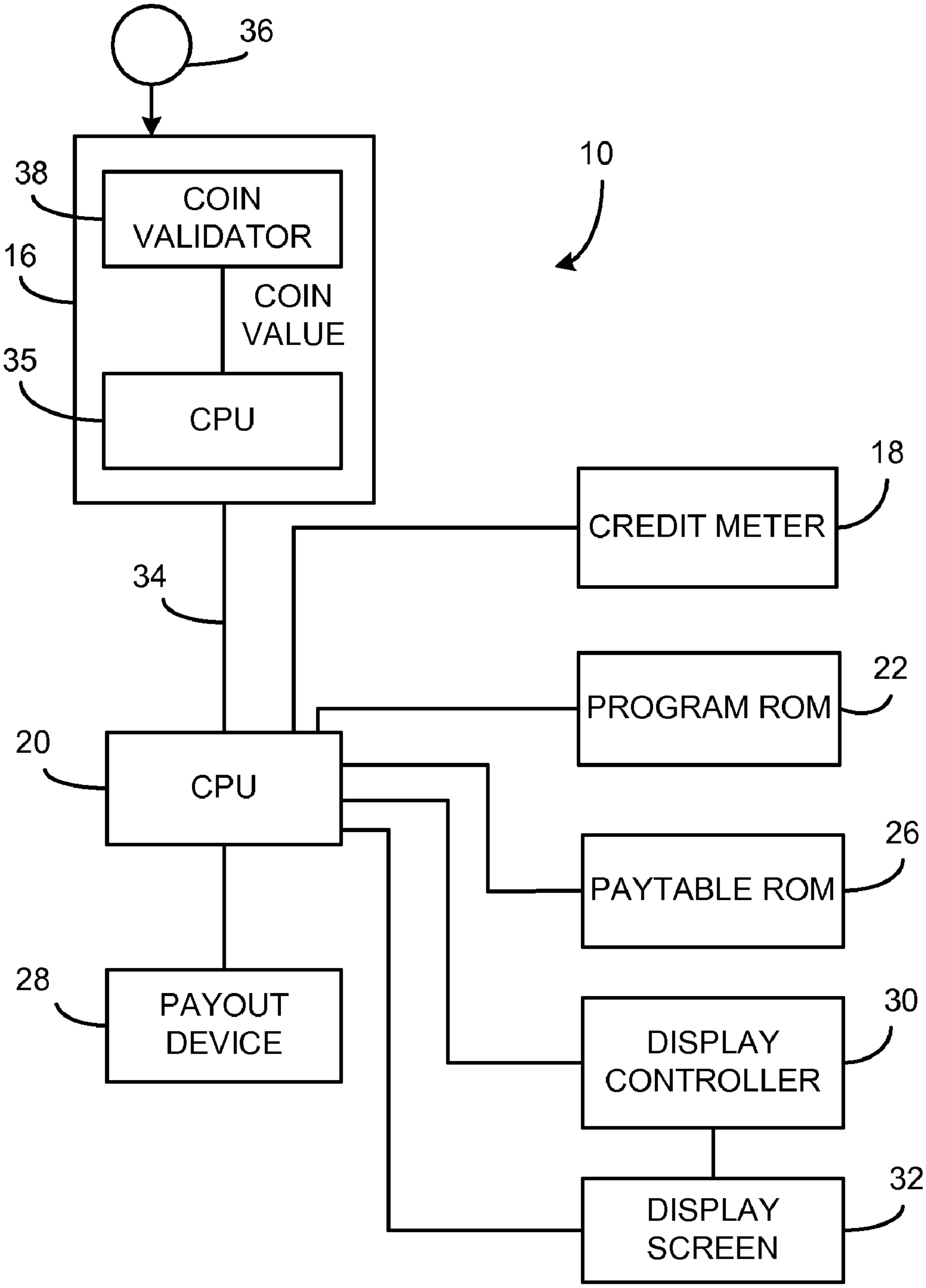
FIG. 1 is a block diagram of a gaming machine 10 illustrating a coin/credit detector and main control unit performing the authentication technique of the present invention.

In the example of FIG. 1, the authentication number is generated by a coin/credit detector 16, although the invention is applicable to authenticating data generated by any peripheral device within or external to the gaming machine.

The coin/credit detector 16 generates signals corresponding to the amount of money inserted into detector 16. Detector 16 encompasses any type of unit that receives money or a monetary equivalent to generate credits within the machine. Examples of such detectors include a coin validator, a bill validator, a smart card reader, a magnetic card reader, an optical code (e.g., barcode) reader, or any other type of reader for detecting information. Detector 16 may also include a writer or printer for recording credits on a card or ticket.

Credits are displayed by a credit meter 18 and stored in a memory. Stored credits are used to play the machine and include award credits.

A CPU 20 (a processor) runs a gaming program stored in a program ROM 22. In one example of a gaming program, CPU 20 receives various commands from the gaming device console and pseudo-randomly selects symbols to be displayed in a matrix. The display may take the form of simulated rotating reels. A pay table ROM 26 receives signals corresponding to the combinations of symbols across pay lines through the matrix and identifies awards to be paid to the player. A payout device 28 pays the award to the player in the form of credits or coins.

A display controller 30 receives commands from CPU 20 and generates signals for a display screen 32. Alternatively, the gaming machine may use motor driven reels. If the display screen 32 is a touch screen, the player's commands may be input through the display screen 32 to CPU 20.

In one embodiment, CPU 20 carries out all necessary steps for controlling the various peripherals and for operating the game. There may be other peripheral devices, such as a sound board and a light controller.

The invention will be described with respect to the communications between the coin/credit detector 16 and CPU 20, although the same invention may be applied to authenticate data between CPU 20 and any peripheral device. The invention may be carried out using a software routine (or firmware) in conjunction with conventional gaming machine hardware.

CPU 20 periodically generates a transaction request command code and a transaction number and transmits the request and transaction number to detector 16 via a bus 34. The transaction request is similar to polling. The transaction number may be any non-constant number generated by CPU 20 and, in one embodiment, this number changes after each transaction with detector 16 or changes each time CPU 20 generates a periodic transaction request. CPU 20 temporarily stores this transaction number. More details regarding this transaction number will be described below.

In one embodiment, along with the transaction number, CPU 20 also transmits a constant to detector 16 for added security. This constant may be virtually any number such as the serial number of the coin validator 38. In another embodiment, the constant is not transmitted since it is already known by a CPU 35 in detector 16 and need not be based on any calculations by CPU 20. In yet another embodiment, the use of the constant is completely omitted in the calculation of the authentication number (to be described below) since the transaction number provides sufficient encryption of the credit data.

In another embodiment, instead of the constant, a non-random number, such as the date or the time, may be used along with the transaction number to encrypt the credit data.

Communications between CPU 20 and detector 16 may take virtually any form, such as using the RS-232 standard, a universal serial bus (USB) standard, or any other type of communications interface.

If there is no new coin inserted into detector 16, in response to the transaction request from CPU 20, CPU 35 in detector 16 sends back a no-credit response to CPU 20 without any authentication number.

If a new coin 36 has been validated by a conventional coin validator 38 (forming a portion of detector 16), the following actions are taken. Sometime after coin 36 is inserted into validator 38, CPU 20 will transmit to CPU 35 a transaction request command code along with a transaction number and a constant. CPU 35 then performs an algorithm using the credit value of the deposited coin, the random transaction number received from CPU 20, and the constant (if used). The algorithm may be any form of algorithm that uses these three values in generating an authentication number. A simple example of one type of algorithm may be 5x+3y+7z, where x is the transaction number, y is the credit value of the coin, and z is the constant. Obviously, more complex algorithms may be used to further encrypt the credit value. The transaction number essentially acts as an encryption key to generate the authentication number.

CPU 35 then transmits this authentication number to CPU 20 and also transmits a non-encrypted (clear text) version of the credit value of the coin. The values may be sent serially over bus 34.

CPU 20 performs a reverse authentication algorithm on the authentication number, using the transaction number and the constant, to derive the coin credit value from the authentication number. This derived credit value is then compared to the unencrypted credit value transmitted by CPU 35 to CPU 20. If there is a match, the credit value is booked to the credit meter 18 (a memory) within the gaming machine 10 so that the player may then use the booked credits to play the game. The credit meter 18 contents are displayed to the player. If there is no match, the data is ignored by CPU 20, and an error signal is optionally generated.

In one embodiment, the transaction number may be generated by a pseudo-random number generator, and the authentication number is two bytes. The transaction number may be periodically generated, such as after a few milliseconds, or after each coin is deposited.

A similar calculation of an authentication number that encrypts data to be transmitted may be performed by any other peripheral device. Such other peripheral devices include bill validators, card readers, and paper ticket readers, and are all intended to be encompassed by detector 16. For example, data in a smart card identifies the number of credits to be booked in the gaming machine 10. CPU 35 generates the authentication number, using the credit data in the smart card, the transaction number from CPU 20, and the constant (if a constant is used). The authentication number and the unencrypted (clear text) credit value are sent to CPU 20. CPU 20 then derives the credit value from the authentication number and compares the derived credit value to the clear text credit value. If there is a match, the credits are booked. A single CPU 35 may be shared by multiple peripheral devices.

Similarly, if the game to be played involves a mechanical device, such as rotating reels with an optical or electrical detector for detecting the position of the reels, such positional data may be used to generate an authentication number. This authentication number is sent to CPU 20 along with the clear text data so CPU 20 can detect whether the data is authentic. If authentic, then the data is used by CPU 20 in the calculation of an award for the player.

Although the present invention is explained with reference to a peripheral device transmitting data to the main control unit, the invention is also applicable to authenticating data transmitted from the main control unit to a peripheral device, where the above-described functions of the control unit and peripheral device are reversed. If data transmitted by CPU 20 to a peripheral device is to be protected, CPU 20 may calculate an authentication number based on a transaction number, the data to be transmitted, and a constant (if used) and transmit the authentication number along with the clear text data to a peripheral device. The peripheral device derives the data from the authentication number and compares it to the clear text data. If there is a match, the peripheral device acts on the data. If not, the peripheral device ignores the data.

The above-described technique for authenticating data may be performed outside the gaming machine, such as on data transmitted to a central server forming part of a gaming system.

While particular embodiments have been shown and described, it would be obvious to those skilled in the art that changes and modifications may be made without departing from this invention in its broadest aspects and, therefore, the appended claims are to encompass within their scope all such changes and modifications as fall within the true spirit and scope of this invention.

What is claimed is:

1. A gaming method performed in a gaming device, the gaming device comprising a first processor and at least one second processor, the gaming method comprising:

receiving by the second processor a first number, the first number being changed based on certain events;

generating first data by the second processor for being transmitted to the first processor;

calculating an authentication number by the second processor by performing an algorithm using at least the first number and the first data to generate the authentication number;

transmitting by the second processor to the first processor the authentication number and the first data;

deriving by the first processor, using at least the first number, derived data from the authentication number;

comparing the derived data, derived from the authentication number, with the first data transmitted by the second processor to the first processor; and if there is a match, using the first data itself by the first processor to carry out a gaming function unrelated to verifying data, and, if there is not a match, not using the first data by the first processor to carry out a gaming function.

2. The method of claim 1 wherein the gaming device is a gaming machine.

3. The method of claim 1 wherein the gaming device is a gaming system.

4. The method of claim 1 wherein the first number is changed based on a period of time.

5. The method of claim 1 wherein the first number is changed after each credit transaction.

6. The method of claim 1 wherein the first data represents credits or a monetary value.

7. The method of claim 1 further comprising the second processor calculating the authentication number based on a non-random second number as well as the first number and the first data.

8. The method of claim 1 further comprising the first processor transmitting a command to the second processor along with the first number, the command requesting the second processor to transmit the first data.

9. The method of claim 1 wherein the first processor is a main control unit in a gaming machine, and the second processor is a peripheral device.

10. The method of claim 1 wherein the first processor is a peripheral device, and the second processor is a main control unit in a gaming machine.

11. The method of claim 1 wherein the second processor communicates with a monetary detector device.

12. The method of claim 11 wherein the monetary detector device is a coin validator.

13. The method of claim 11 wherein the monetary detector device is a bill validator.

14. The method of claim 1 further comprising pseudo-randomly generating the first number by the first processor.

15. The method of claim 1 further comprising pseudo-randomly generating the first number by the first processor after a period of time.

16. The method of claim 1 further comprising pseudo-randomly generating the first number by the first processor after each monetary transaction.

17. The method of claim 1 further comprising the second processor calculating the authentication number based on a constant as well as the first number and the first data.

18. The method of claim 1 wherein using the first data by the first processor to carry out a gaming function comprises using the first data to book credits to a credit meter.

19. A gaming device comprising:

a first processor;

at least one second processor generating first data for the first processor, the first processor and the second processor being programmed to carry out the following method comprising:

receiving by the second processor a first number from the first processor, the first number being changed based on certain events;

generating the first data by the second processor for being transmitted to the first processor;

calculating an authentication number by the second processor by performing an algorithm using at least the first number and the first data to generate the authentication number;

transmitting by the second processor to the first processor the authentication number and the first data;

deriving by the first processor derived data from the authentication number;

comparing the derived data, derived from the authentication number, with the first data transmitted by the second processor to the first processor; and if there is a match, using the first data itself by the first processor to carry out a gaming function unrelated to verifying data, and, if there is not a match, not using the first data by the first processor to carry out a gaming function.

20. The device of claim 19 wherein the gaming device is a gaming machine.

21. The device of claim 19 wherein the gaming device is a gaming system.

22. The device of claim 19 wherein the first processor is a main control unit in a gaming machine, and the second processor is a peripheral device.

23. The device of claim 19 wherein the first processor is a peripheral device, and the second processor is a main control unit in a gaming machine.

24. The device of claim 19 further comprising a monetary detector device communicating with the second processor.

25. The device of claim 19 wherein the first processor pseudo-randomly generates the first number.

26. The device of claim 19 wherein the first processor pseudo-randomly generates the first number after a period of time.

27. The device of claim 19 wherein the first processor pseudo-randomly generates the first number after each monetary transaction.

28. The device of claim 19 wherein the second processor calculates the authentication number based on a constant as well as the first number and the first data.

29. The device of claim 19 wherein the first data represents credits or a monetary value.

* * * * *